Oct. 29, 1929.  H. R. PORTER  1,733,276
CHECK OR GLOBE VALVE
Filed April 7, 1928

INVENTOR,
Harper R Porter,
BY
His ATTORNEY.

Patented Oct. 29, 1929

1,733,276

UNITED STATES PATENT OFFICE

HARPER R. PORTER, OF NILES, OHIO, ASSIGNOR TO THE COLUMBUS MACHINE COMPANY, OF COLUMBUS, OHIO, A CORPORATION OF OHIO

CHECK OR GLOBE VALVE

Application filed April 7, 1928. Serial No. 268,138.

This invention relates to check valves and has for its principal objects the provision of a valve of that type wherein the hub members constitute a unit that is shrunk on to the body unit, said valve being highly efficient, of unusually sturdy construction and being cheap to manufacture and assemble. Other advantages are hereinafter set forth.

In the accompanying drawings in which I have illustrated a swing check valve embodying a preferred form of my invention Figure 1 is a longitudinal elevation of said valve;

Figure 1:
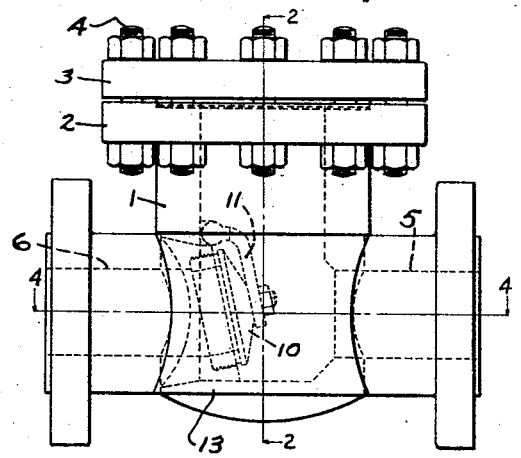

Referring to the drawings and the valve assembly shown therein, the reference numeral 1 designates the casing of an extruded, drop forged or cast steel valve body having an upper terminal flange 2 to which is bolted the top plate 3 by means of bolts 4 in the usual manner. Said casing has opposed alined apertures 5 and 6 respectively, the latter being flared at its outer end to permit of the reception therein of a seat sleeve or external bushing member 8, the walls of which are of variable section so as to insure a fluid-tight fit between the outer wall of said bushing and the peripheral wall of the aperture 6. Said bushing has a central cross-section corresponding in cross-section to the cross-section of aperture 5 and is recessed to receive a seat ring 9 which is threaded thereinto. A swing check valve 10, which is adapted to seat on said seat ring to close the valve, is pivotally secured by a swinging arm 11 between lugs 12 formed on the inner wall of the casing 1 in the well known manner.

Figures 2, 3:
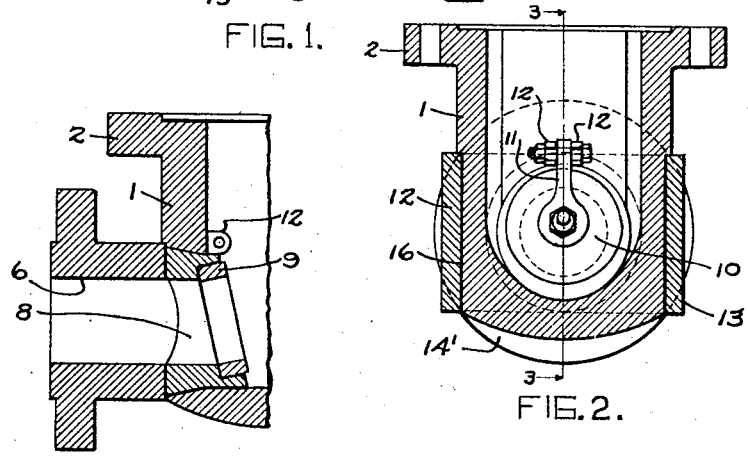
Fig. 2 is a transverse vertical section on the line 2—2 of Fig. 1.
Fig. 3 is a vertical section on the line 3—3 of Fig. 2.
Figure 4:
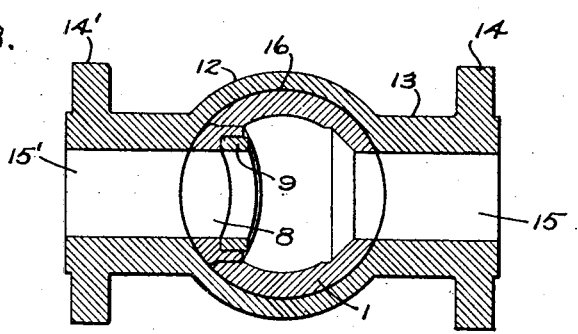
Fig. 4 is a horizontal section on the line 4—4 of Fig. 1.
Figures 5, 6:
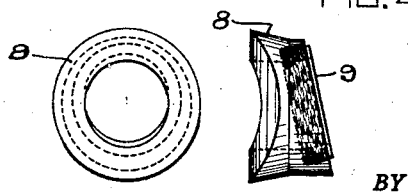
Fig. 5 is an end elevation from the outer end of the seat sleeve with its seat in position therein.
Fig. 6 is a side elevation of said sleeve.

The lower end of the valve body 1 is of a reduced section below a point about midway from top to bottom of said body, and preferably circular in section, to admit of a hub unit 13 being fitted thereover and then shrunk thereon. Said hub unit consists of similar hub members 14, 14′ having alined, axial apertures 15, 15′ which are adapted to register with apertures 5 and 6 respectively. The hub unit has an enlarged bore 16 which is of a cross-section throughout identical in configuration but just sufficiently smaller than that of the lower end of the casing 1 so as to admit of the same being shrunk on to a fluid tight-fit with casing 1 in the well known manner, by first heating the hub unit to expand the bore 16 and then applying the same to the casing 1 into the position shown in Figs. 1 to 4 and then allowing the same to cool and shrink thereover.

Among the advantages of my improved construction are that the wall of the valve body at the point of juncture with the hub members are reinforced instead of being alined, and at the same time such construction admits of hub members of considerably varying size in so far as the diameter of the flanged ends of the same are concerned being applied to a standard valve body. Furthermore, the valve body can be formed by an extrusion method, or cast or drop-forged as above stated, and the apertures for the line connections subsequently pierced therethrough by a boring operation and the hub unit is similarly extruded, cast or drop-forged in a separate operation. Again, the fact that the valve assembly has the seat sleeve unit fitted into position in the aperture in the valve body prior to the application of the hub unit thereto, the permanent positioning of such sleeve and its final predetermined position is assured. This valve construction is withal extremely simple and easy to assemble.

If desired, the joint between the hub unit and the valve body can be fillet welded in order to improve the appearance of the same and gives the effect of a one-piece valve, but in so far as the strength is concerned, such welding is unnecessary.

Without departing from the spirit of my invention, various modifications within the scope of the appended claims can be made.

Having thus described my invention, what I claim and desire to obtain by United States Letters Patent is:

1. A valve assembly, comprising a valve body having a central valve chamber and a lateral aperture extending through the wall of said body into said chamber, a seat sleeve unit having a central aperture therethrough tightly fitted into the lateral aperture in said valve body, a valve seat surrounding said aperture, a swing check valve adapted to co-operate with said valve seat and seal the opening through said aperture and a hub unit having a plurality of hub members embracing said body and tightly shrunk thereon so as to have fluid-tight engagement therewith.

2. In a valve assembly, the combination comprising a valve body having a central valve chamber and aligned lateral apertures extending through the walls thereof, a seat sleeve unit tightly fitted in one of said apertures, said seat sleeve unit at its inner end being of a cross-section corresponding to a minimum cross-section of said aperture and said seat sleeve unit at its outer end being of substantially greater cross-section, which cross-section corresponds substantially to the cross-section of said apertures at its outer end, whereby when said seat sleeve unit is inserted into said apertures from the outside thereof, the extent of the inward movement of the same can be predetermined, a hub unit having a plurality of hub members thereon, which envelopes said valve body and is shrunk thereon to a fluid-tight fit, said hub unit having an expanded central portion which has an aperture extending completely therethrough adapted to receive said valve body, a fluid-way extending longitudally of the unit and intersecting the other apertures therein at right angles thereto.

3. In a valve assembly, the combination comprising a valve body having a central valve chamber and opposed aligned apertures extending through the walls thereof, a seat sleeve unit tightly fitted in one of said apertures, the same having a central aperture extending therethrough, a seat ring surrounding the aperture in said sleeve, a swing check valve adapted to co-operate with said seat and capable of sealing the aperture therethrough and a separate hub unit having a plurality of hub members enveloping said body and shrunk thereover into a fluid-tight fit.

Signed at Niles, in the county of Trumbull and State of Ohio, this 8th day of March, 1928.

HARPER R. PORTER.